United States Patent
Ichikawa et al.

(10) Patent No.: US 7,470,303 B2
(45) Date of Patent: Dec. 30, 2008

(54) CERAMIC FILTER STRUCTURE

(75) Inventors: Shuichi Ichikawa, Handa (JP); Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 520 days.

(21) Appl. No.: 10/548,368

(22) PCT Filed: Mar. 23, 2004

(86) PCT No.: PCT/JP2004/003910

§ 371 (c)(1),
(2), (4) Date: Sep. 7, 2005

(87) PCT Pub. No.: WO2004/087297

PCT Pub. Date: Oct. 14, 2004

(65) Prior Publication Data

US 2006/0144027 A1    Jul. 6, 2006

(30) Foreign Application Priority Data

Mar. 28, 2003   (JP) .............................. 2003-089840

(51) Int. Cl.
B01D 46/00 (2006.01)
F01N 3/022 (2006.01)

(52) U.S. Cl. ........................ 55/523; 55/282.2; 55/282.3; 55/385.3; 55/DIG. 10; 55/DIG. 30; 60/311; 428/116

(58) Field of Classification Search ................. 55/282.2, 55/282.3, 385.3, 523, 524, DIG. 10, DIG. 30; 60/311; 428/116, 117, 118
See application file for complete search history.

(56) References Cited

U.S. PATENT DOCUMENTS

| 4,740,408 A * | 4/1988 | Mochida et al. .............. 55/523 |
| 5,545,243 A * | 8/1996 | Kotani et al. ................. 55/523 |
| 2003/0024220 A1 | 2/2003 | Ishihara et al. |
| 2007/0204580 A1* | 9/2007 | Kunieda ...................... 55/523 |
| 2007/0294989 A1* | 12/2007 | Ichikawa ..................... 55/523 |

FOREIGN PATENT DOCUMENTS

| EP | 0 658 363 A1 | 6/1995 |
| EP | 1 125 704 A1 * | 8/2001 |
| EP | 1 264 971 A1 * | 12/2002 |
| JP | A 56-129020 | 10/1981 |
| JP | A 11-264604 | 9/1999 |

(Continued)

*Primary Examiner*—Jason M Greene
(74) *Attorney, Agent, or Firm*—Oliff & Berridge, PLC

(57) ABSTRACT

The ceramic filter structure 1 of the present invention comprises plural cells defined by partition walls 2 having a porous structure to form flow passages of fluid, plugged portions being formed at one open end portion of specified cells and another open end portion of the remaining cells to allow partition walls 2 to serve as filtration layers, wherein the ratio ($S_2/S_1$) of the actual area ($S_2$) of the portion 10 of all actual area of one surface 7 of a specified region 6 of partition walls 2 which can be viewed from a vertical direction to a plane of projection obtained by vertically projecting the specified region 6 of partition walls 2 on a plane from the one surface 7 side to the area ($S_1$) of the said plane 8 of projection is 5-30. This ceramic filter structure can reduce pressure loss increase at time of collecting particulates.

9 Claims, 7 Drawing Sheets

FOREIGN PATENT DOCUMENTS

| | | |
|---|---|---|
| JP | A 2001-190916 | 7/2001 |
| JP | A 2002-355511 | 12/2002 |
| JP | 2003-1029 * | 1/2003 |
| JP | A 2003-1029 | 1/2003 |
| WO | WO 00/69542 | 11/2000 |

* cited by examiner

PRIOR ART

PRIOR ART

CERAMIC FILTER STRUCTURE

TECHNICAL FIELD

The present invention relates to a ceramic filter structure. More particularly, it relates to a ceramic filter structure capable of reducing increase in pressure loss when it collects particulates.

BACKGROUND ART

Recently, ceramic filter structures excellent in heat resistance and corrosion resistance are used as filters for dust collection used for environmental protection such as prevention of environmental pollution and recovery of products from high-temperature gases in a wide variety of the fields such as chemical industry, power industry, steel industry and industrial waste disposal. For example, ceramic filter structures are suitably used as filters for dust collection which are used in atmospheres of high temperature and corrosive gas, such as diesel particulate filters (DPF) collecting particulates discharged from diesel engines.

The ceramic filter structure used for these purposes is generally a ceramic filter structure 21 comprising a plurality of cells 23 defined by partition walls 22 having a porous structure to form flow passages of fluid, wherein plugged portions 25 are formed at one open end portions 24a of specified cells 23 and the other open end portions 24b of the remaining cells 23 to allow the partition walls 22 to serve as filtration layers as shown in FIG. 10 (see, for example, JP-A-56-129020).

When a fluid to be treated, for example, an exhaust gas, flows into the cells 23 of the ceramic filter structure 21 from one open end portions 24a, since the other open end portions 24b of the cells 23 are plugged with the plugged portions 25, the gas flowing into the cells 23 passes through the partition walls 22 having a porous structure and flows out from the cells 23, the other open end portions 24b of which are not plugged. In this case, the partition walls 22 act as a filter to collect particulates such as soot contained in the exhaust gas.

The ceramic filter structure 21 which has collected particulates gradually increases in its pressure loss. The increase of the pressure loss is caused by deposition of the collected particulates on the surface of the partition walls 22, and there are two stages in the process of increase of the pressure loss in the ceramic filter structure as shown in FIG. 11. The first stage A comprises an increase of the pressure loss caused by deposition of the particulates in the pore parts of the partition walls having a porous structure and the uneven dent parts on the surface of the partition walls constituting the ceramic filter structure, and the second stage B comprises an increase of the pressure loss caused by complete filling up of the uneven dent parts on the surface of the partition walls with the particulates and the subsequent formation of a film with the particulates on the surface of the partition walls, the thickness of which gradually increases.

The increase of pressure loss of the first stage A is determined by properties of the particulates, arrangement of ceramic particles constituting the ceramic filter structure, shape of the pore parts of the partition walls and shape of uneven dents on the surface of the partition walls. The increase of pressure loss of the second stage B is determined not by the shape of the ceramic filter structure, but by the properties of the particulates and thickness of the film formed by the particulates.

DISCLOSURE OF INVENTION

However, conventional ceramic filter structures suffer from the problem that when they are installed, for example, on exhaust lines of diesel engines, sufficient output performance of the engines can hardly be maintained if the pressure loss increases as in the first stage A and second stage B mentioned above. Especially, when particulates deposit on the partition walls, there is the problem that the rate of increase of pressure loss in the first stage A is great, but no effective countermeasure has been taken to reduce the pressure loss of the first stage A.

The present invention has been made in view of the above problems to provide a ceramic filter structure reduced increase in pressure loss at the time of collecting particulates.

The ceramic filter structure of the present invention comprises a plurality of cells defined by partition walls having a porous structure to form flow passages of fluid, plugged portions being formed at one open end portions of specified cells and the other open end portions of the remaining cells to allow the partition walls to serve as filtration layers, wherein the ratio ($S_2/S_1$) of the actual area ($S_2$) of the portion of all actual area of one surface of a specified region of the partition walls which can be viewed from a vertical direction to a plane of projection obtained by vertically projecting the specified region of the partition walls on a plane from the one surface side to the area ($S_1$) of the plane of projection is 5-30.

Furthermore, in the present invention, it is preferred that the ratio ($S_2/S_1$) of actual area ($S_2$) of the portion of all actual area of one surface of a specified region of the partition walls which can be viewed from a vertical direction to a plane of projection obtained by vertically projecting the specified region of the partition walls on a plane from the one surface side to the area ($S_1$) of the plane of projection is 5-25.

Moreover, it is preferred that the constituent material of the ceramic filter structure of the present invention is at least one material selected from the group consisting of cordierite, silicon carbide, sialon, composite material of metallic silicon-silicon carbide and silicon nitride, and furthermore it is preferred that the constituent material of the partition walls is a porous material having a porosity of 30-80%.

Further, in the present invention, it is preferred that the shape of the open end portion of the cells is triangular, tetragonal, hexagonal or corrugated.

BEST MODE FOR CARRYING OUT THE INVENTION

Figure 1:
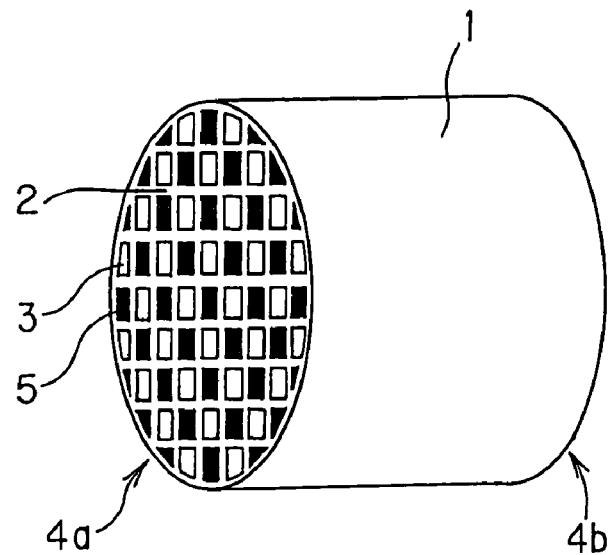
FIG. 1 is an oblique view which schematically shows the ceramic filter structure of one embodiment of the present invention.

One embodiment of the ceramic filter structures of the present invention will be explained referring to the drawings. This embodiment should not be construed as limiting the invention in any manner and various changes, modifications and improvements may be made on the basis of the knowledge of those skilled in the art without departing from the scope of the invention.

Figure 2:
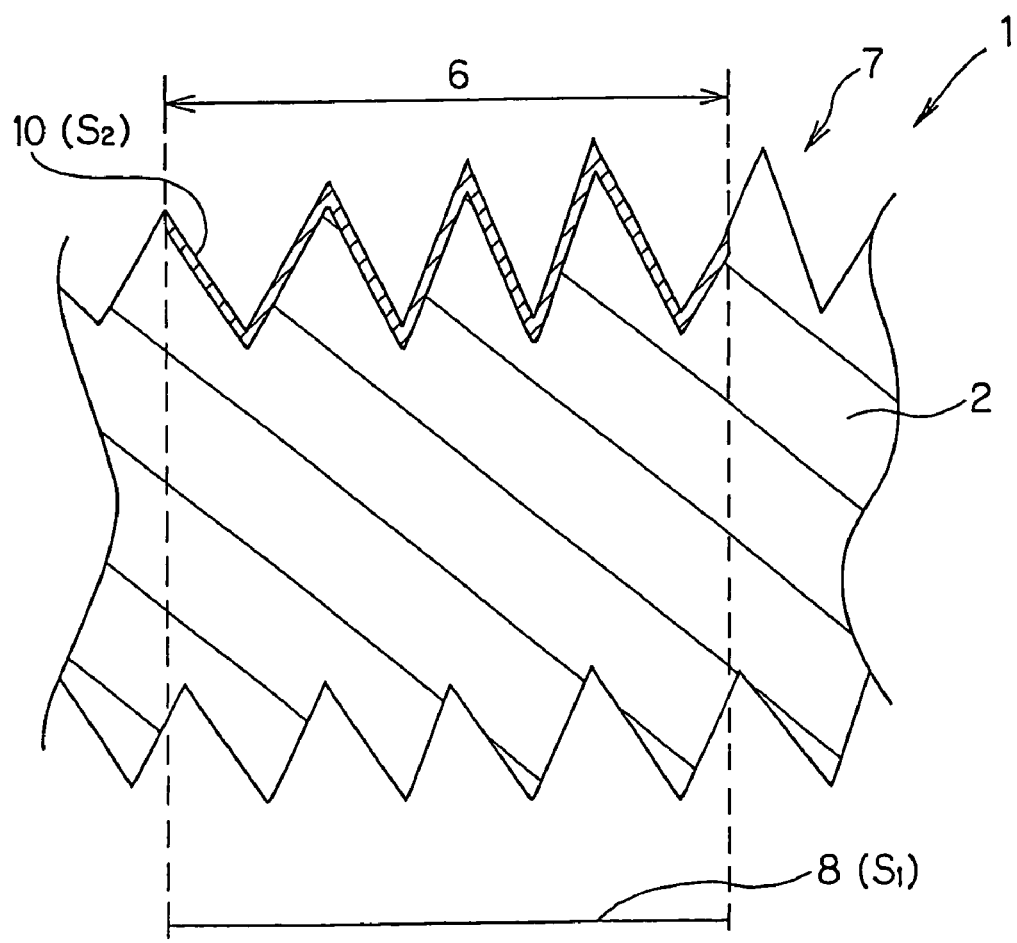
FIG. 2 is a partially enlarged sectional view which schematically shows the partition wall constituting the ceramic filter structure of one embodiment of the present invention.

FIG. 1 is an oblique view which schematically shows the ceramic filter structure of this embodiment, and FIG. 2 is a partially enlarged sectional view which schematically shows the partition walls constituting the ceramic filter structure of this embodiment. As shown in FIG. 1, the ceramic filter structure 1 of this embodiment comprises a plurality of cells 3 defined by partition walls 2 having a porous structure to form flow passages of fluid, plugged portions 5 being formed at one open end portions 4a of specified cells 3 and the other open end portions of the remaining cells 3 to allow the partition walls 2 to serve as filtration layers, and, as shown in FIG. 2, the ratio ($S_2/S_1$) of actual area ($S_2$) of the portion 10 of all actual area of one surface of a specified region 6 of the partition walls 2, the portion 10 (hereinafter sometimes referred to as "viewable portion 10") being a portion viewable from a vertical direction to a plane 8 of projection obtained by vertically projecting the specified region 6 of the partition walls 2 on a plane from the one surface 7 side (hereinafter sometimes referred to merely as "plane 8 of projection"), to the area ($S_1$) of the plane 8 of projection, is 5-30.

By constructing the ceramic filter structure as above, the ceramic filter structure 1 of this embodiment is reduced in increase of pressure loss when it collects particulates.

If the ratio ($S_2/S_1$) of the actual area ($S_2$) of the viewable portion 10 to the area ($S_1$) of the plane 8 of projection is less than 5, there cannot be obtained the effect to reduce the increase of pressure loss in the case of using the ceramic filter structure 1 as a filter. With increase of the ratio ($S_2/S_1$) of the actual area ($S_2$) of the viewable portion 10 to the area ($S_1$) of the projected plane 8 to 5 or higher, the effect to reduce the increase of the pressure loss increases, but when the ratio ($S_2/S_1$) of the actual area ($S_2$) of the viewable portion 10 to the area ($S_1$) of the plane 8 of projection exceeds 30, the ceramic filter structure 1 is too low in mechanical strength and cannot substantially be used as a filter.

In this embodiment, the ratio ($S_2/S_1$) of the actual area ($S_2$) of the viewable portion 10 to the area ($S_1$) of the plane 8 of projection is more preferably 5-25, and especially preferably 10-25.

Figure 3:
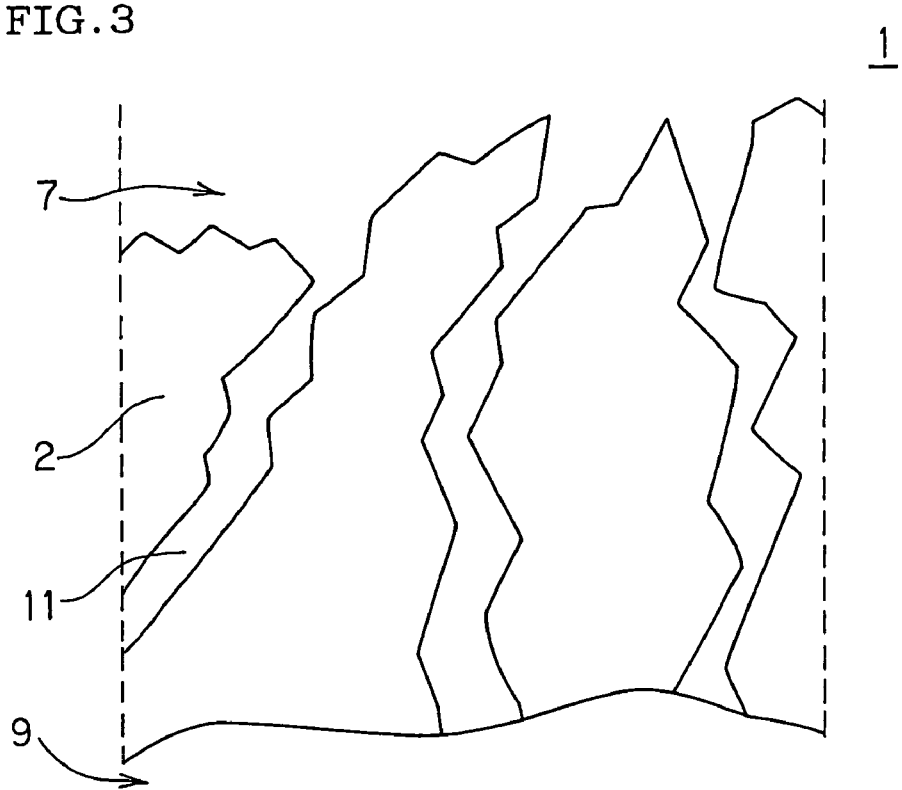
FIG. 3 is a partially enlarged sectional view of the surface side of the partition wall constituting the ceramic filter structure of one embodiment of the present invention.
Figure 4:
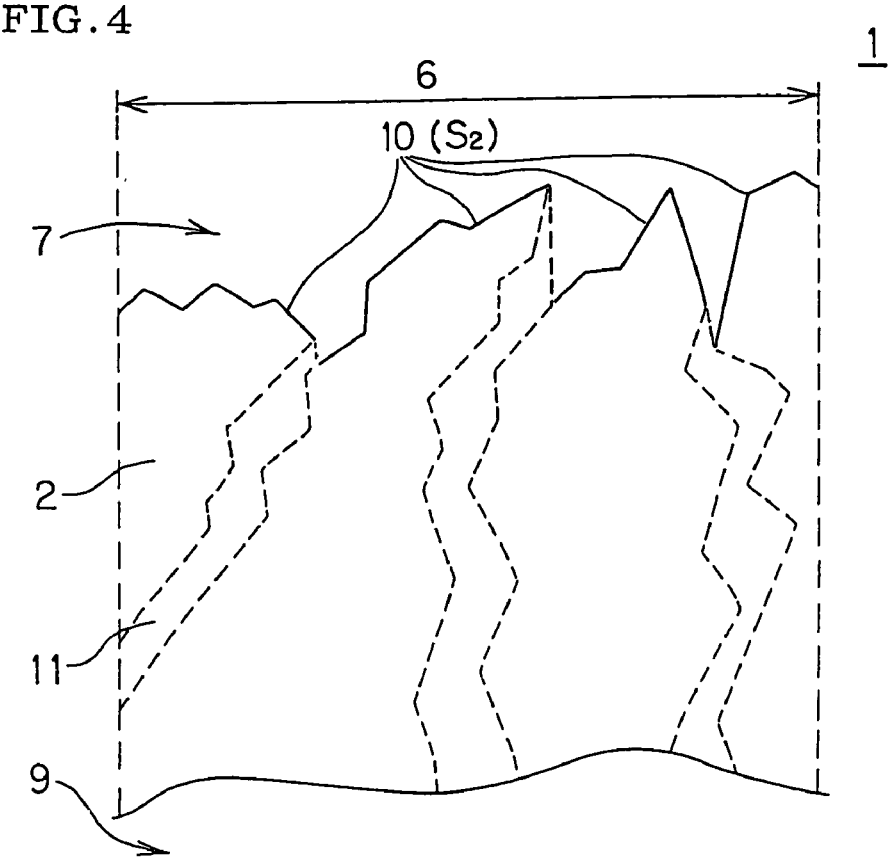
FIG. 4 is a partially enlarged sectional view of the surface side of the partition wall constituting the ceramic filter structure of one embodiment of the present invention.

The viewable portion 10 of the ceramic filter structure 1 will be explained in more detail. FIG. 3 and FIG. 4 are partially enlarged sectional views on the side of one surface 7 of the partition wall 2 constituting the ceramic filter structure 1 of this embodiment, and as shown in FIG. 3 and FIG. 4, the partition wall 2 having a porous structure constituting the ceramic filter structure 1 has pores 11 communicating between the side of one surface 7 and the side of another surface 9, and the configuration of the one surface 7 of the partition wall 2 is complicatedly uneven. As shown in FIG. 4, the viewable portion 10, namely, the portion 10 which can be viewed from a direction vertical to a plane of projection in all actual area of the one surface 7 of the specified region 6, is the portion indicated by a solid line, and the actual area of this viewable portion 10 can be measured, for example, using a laser microscope or the like.

The constituent material of the partition walls 2 constituting the ceramic filter structure 1 of this embodiment preferably comprises at least one material selected from the group consisting of cordierite, silicon carbide, sialon, composite materials of metallic silicon-silicon carbide and silicon nitride. By using the above materials, the resulting ceramic filter structure 1 can be excellent in endurance. Furthermore, in this embodiment, the constituent material of the partition walls 2 constituting the ceramic filter structure 1 is preferably a porous material having a porosity of 30-80%. If the porosity is less than 30%, the pressure loss is too high, and the function as filter cannot sometimes be performed, and if the porosity exceeds 80%, the ceramic filter structure sometimes lowers in strength and cannot sometimes be used in a severe environment such as DPF. The porosity can be measured by a mercury porosimeter.

Furthermore, in this embodiment, explanation is made referring to a ceramic filter structure 1 having an open end portion of cells 3 which is tetragonal as shown in FIG. 1, but the shape of the open end portion of the cells 3 is not limited to tetragon, but may be, for example, triangle, hexagon and corrugate shape, because the ceramic filter structure having the open end portions of the cells of such a shape is easy in extrusion.

The cell density (the number of cells per unit sectional area) of the ceramic filter structure 1 of this embodiment is not particularly limited, but if the cell density is too low, strength and effective GSA (geometric surface area) as ceramic filter structure 1 may be insufficient, and if the cell density is too high, the pressure loss in flowing of a fluid such as exhaust gas is sometimes large. The range of the cell density is preferably 0.9-311 cells/cm$^2$ (6-2000 cells/in$^2$), more preferably 7.8-155 cells/cm$^2$ (50-1000 cells/in$^2$), especially preferably 15.5-62.0 cells/cm$^2$ (100-400 cells/in$^2$).

Figure 5:
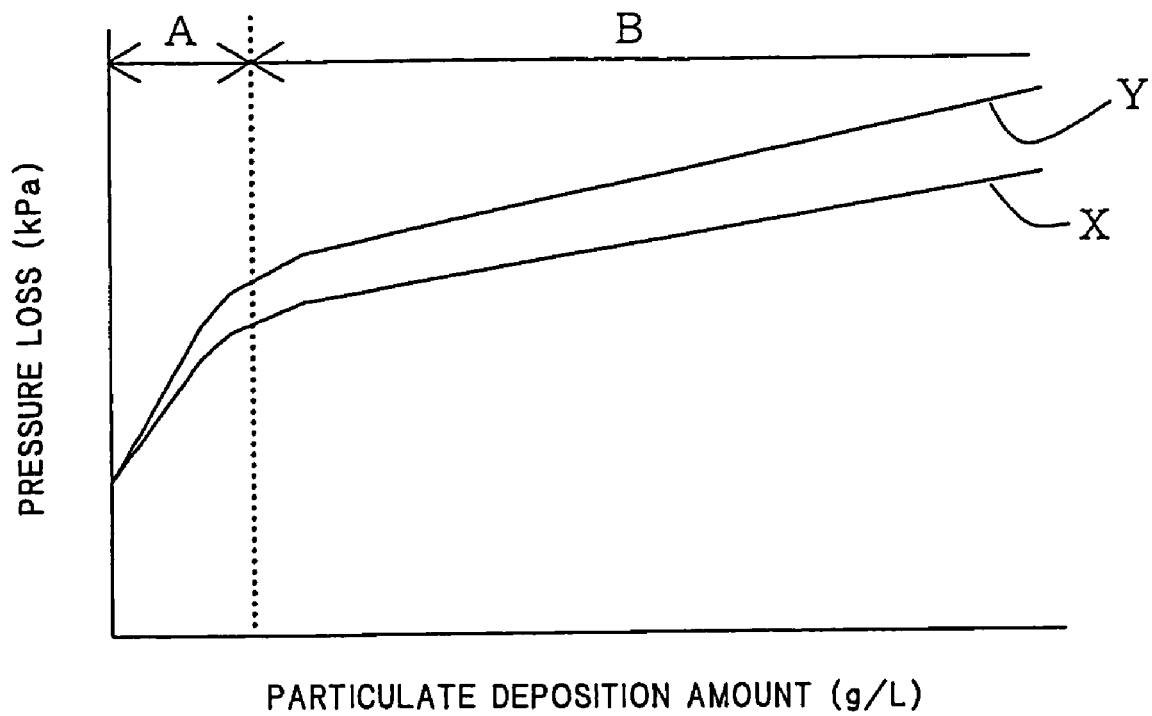
FIG. 5 is a graph which shows relations between deposition amount of particulates and pressure loss of the ceramic filter structure of one embodiment of the present invention and a conventional ceramic filter structure.

FIG. 5 is a graph which shows a relation between deposition amount (g/L) of particulates and pressure loss (kPa) of the ceramic filter structure 1 of this embodiment (see, FIG. 1) and a conventional ceramic filter structure when these were used as filters.

As shown in FIG. 5, the process of increase in pressure loss caused by increase in deposition amount of particulates includes two stages, and the first stage A comprises an increase of the pressure loss caused by deposition of the particulates in the pores 11 (see, FIG. 3) of the partition walls 2 (see, FIG. 3) and uneven dent parts on the surface of the partition walls 2 (see, FIG. 3) constituting the ceramic filter structure 1 (see, FIG. 1), and the second stage B comprises an increase of the pressure loss caused due to the complete filling up of the pores 11 (see, FIG. 3) of the partition walls 2 (see, FIG. 3) and the uneven dent parts on the surface of the partition walls 2 (see, FIG. 3) with the particulates, and the subsequent formation of a film with the particulates on the surface of the partition walls 2 (see, FIG. 3) and increase of the thickness of the film. In the curve X which shows the pressure loss in the ceramic filter structure of this embodiment, the increase in pressure loss in the first stage A is reduced, and, thus, when the curve is compared with the curve Y which shows the pressure loss in a conventional ceramic filter structure, it is recognized that the pressure loss can be reduced by 45% at the maximum in the case of the same amount of particulates being deposited.

Next, the method for producing the ceramic filter structure of this embodiment will be explained. First, a clay which becomes a constituent material such as cordierite, silicon carbide, sialon and silicon nitride or the like upon firing is prepared. This clay can be prepared, for example, by adding water and a binder to a silicon carbide raw material powder and kneading the mixture. Then, the resulting clay is extruded using an extrusion die having a given shape to make a honeycomb body. Then, the resulting honeycomb body is fired, for example, at a temperature of 1300-1500° C. to produce a ceramic filter structure.

In this case, at least one of the following first to third means is carried out in order to adjust the ratio ($S_2/S_1$) of the actual area ($S_2$) of the viewable portion to the area ($S_1$) of the plane of projection in the resulting ceramic filter structure to a given value, namely, 5-30. According to the first means, the clay as a raw material has a micro-structure composed of fine particles. As a specific means, there are used silicon carbide raw material powders or the like which have a fine particle diameter. According to the second means, the particles constituting the ceramic filter structure have such a micro-structure as having protrusions formed on their surface. As a specific means, when the silicon carbide raw material powder used is metallic silicon-bonded silicon carbide, metallic silicon or the like which is once molten at the firing step is precipitated on the surface of the particles. According to the third means, the spaces between the particles per se are made larger. As a specific means, a pore forming material or the like is added to the clay as a raw material to increase the porosity of the ceramic filter structure. The porosity is preferably 30-80%, more preferably 40-70%. If the porosity is less than 30%, the pressure loss is too large and the function of filter is sometimes not fulfilled, and if it exceeds 80%, the ceramic filter structure is low in strength, and cannot sometimes be used in a severe environment such as DPF. By carrying out at least one of the above first to third means, the ratio ($S_2/S_1$) of the actual area ($S_2$) of the viewable portion to the area ($S_1$) of the plane of projection of the ceramic filter structure can be adjusted to 5-30.

According to the above construction, the ceramic filter structure of this embodiment can be produced efficiently and at low cost.

EXAMPLES

The present invention will be explained in more detail based on the following examples, which should not be construed as limiting the invention in any manner.

In all the examples, the shape of the ceramic filter structure is cylindrical with a diameter φ of 143.8 mm, a length in axial direction of 152.4 mm and a volume of 2.5 L.

Example 1

Silicon carbide raw material powders having an average particle diameter of 48 µm and metallic silicon powders having an average particle diameter of 4 µm were blended at 80:20 in mass ratio, and to 100 parts by mass of the resulting powders were added 6 parts by mass of methylcellulose as an organic binder, 2.5 parts by mass of a surface active agent and 24 parts by mass of water, followed by uniformly mixing and kneading to obtain a clay to be extruded. The resulting clay was extruded by an extruder into a honeycomb form of 35 mm×35 mm in one side, 152 mm in length, 310 µm in thickness of partition walls and 300 cells/in$^2$ (46.5 cells/cm$^2$) in cell density.

The respective cells of the resulting honeycomb body was alternately plugged, and then the honeycomb body was calcined at 550° C. for 3. hours for degreasing in a low oxygen atmosphere and then fired at 1450° C. for 2 hours in an argon (Ar) atmosphere of reduced pressure of 2 hPa to make a silicon carbide porous body of honeycomb structure. The resulting silicon carbide porous bodies were bonded and further subjected to outer peripheral working to produce a ceramic filter structure (Example 1) of about 144 mm in diameter×about 152 mm in length. The surface of the resulting ceramic filter structure was observed to find that the metallic particles and silicon carbide were in the state of being wetted very well and only a few protrusions of metallic silicon were present on the surface of the particles.

Example 2

A ceramic filter structure (Example 2) was produced by making a silicon carbide porous body of honeycomb structure under the same conditions as in Example 1, except that the calcination was carried out at 500° C. for 3 hours in an oxygen atmosphere and thereafter the firing was carried out at 1450° C. for 2 hours in an argon (Ar) atmosphere of normal pressure. The surface of the resulting ceramic filter structure was observed to find that the metallic particles bonded silicon carbide per se and, besides, many protrusions of metallic silicon were present on the surface of the particles. The pore diameter was 20 µm.

Example 3

A ceramic filter structure (Example 3) was produced under the same conditions as in Example 1, except that silicon carbide particles having an average particle diameter of 33 µm were used. The surface of the resulting ceramic filter structure was observed to find that because of the small particle diameter of the silicon carbide, the pore diameter was also small, namely, 10 µm, which was smaller than in Example 1 and Example 2.

Example 4

A ceramic filter structure (Example 4) was produced under the same conditions as in Example 1, except that 10 parts by mass of starch as a pore forming agent was added to 100 parts by mass of the raw material powders. The surface of the resulting ceramic filter structure was observed to find that by adding the pore forming agent, the porosity increased by about 10% as compared with the porosity of the ceramic filter structure in Example 3.

Comparative Example 1

A ceramic filter structure (Comparative Example 1) was produced by making the silicon carbide porous body of honeycomb structure under the same conditions as in Example 1, except that silicon carbide raw material having an average particle diameter of 12 μm was calcined at 500° C. for 3 hours for degreasing and thereafter fired at 2300° C. for 2 hours in an argon (Ar) atmosphere of normal pressure according to recrystallization method. The surface of the resulting ceramic filter structure was observed to find that the surface of the silicon carbide particles was highly smooth, and the pores had a pore diameter of about 10 μm and were uniformly distributed.

The ratio ($S_2/S_1$) of actual area ($S_2$) of the portion of all actual area of one surface of a specified region of the partition walls which can be viewed from a direction vertical to a plane of projection obtained by vertically projecting the specified region of the partition walls on a plane from the one surface side to the area ($S_1$) of the plane of projection (the ratio ($S_2/S_1$) of actual area ($S_2$) of the viewable portion to the area ($S_1$) of the plane of projection) was calculated on the resulting ceramic filter structures (Examples 1-4 and Comparative Example 1). The results of calculation are shown in Table 1. The actual area of the portion which can be viewed from a direction vertical to the plane of projection in all actual area of one surface of the specified region was measured using a laser microscope (ultra-depth profile measuring microscope manufactured by KEYENCE). The ratio ($S_2/S_1$) of actual area ($S_2$) of the viewable portion to the area ($S_1$) of the plane of projection in the ceramic filter structures of the examples was 6.5 in the ceramic filter structure of Example 1, 10 in the ceramic filter structure of Example 2, 15 in the ceramic filter structure of Example 3, and 25 in the ceramic filter structure of Example 4. The ratio in the conventional ceramic filter structure of Comparative Example 1 was 2.0.

TABLE 1

|  | Ratio of actual area of viewable portion to area of plane of projection |
| --- | --- |
| Example 1 | 6.5 |
| Example 2 | 10 |
| Example 3 | 15 |
| Example 4 | 25 |
| Comparative Example 1 | 2 |

Furthermore, a gas containing soot as particulates was passed through the resulting ceramic filter structures (Examples 1-4 and Comparative Example 1), and increase of pressure loss of the ceramic filter structures was measured. The relation between the deposition amount of particulates (g/L) and the pressure loss (kPa) obtained by the measurement is shown in FIG. 6.

Figure 6:
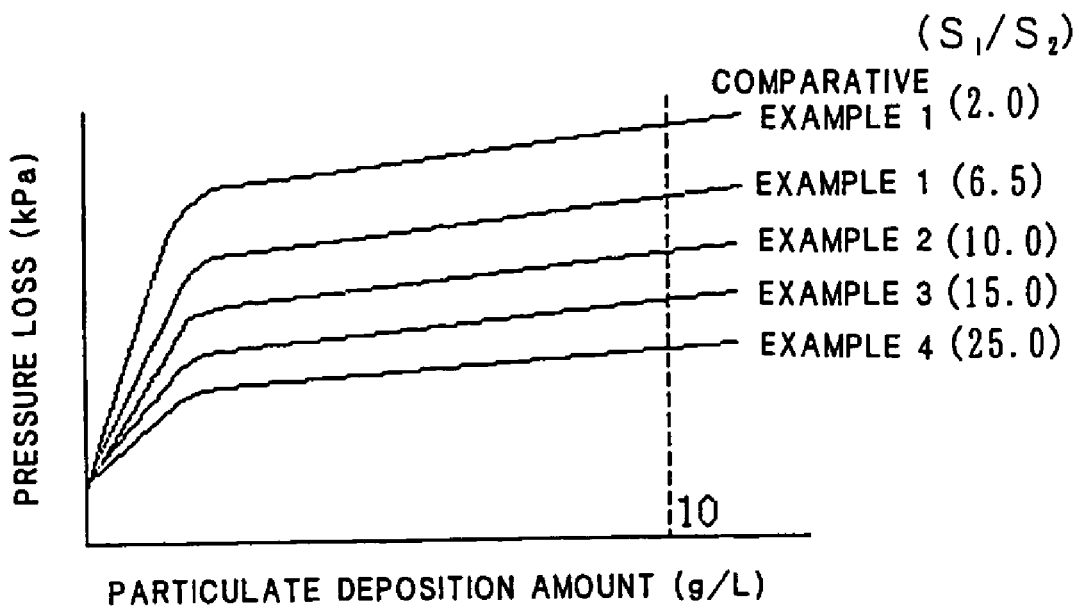
FIG. 6 is a graph which shows relations between deposition amount of particulates and pressure loss of the ceramic filter structure in the examples of the present invention.

As shown in FIG. 6, the ceramic filter structure (Example 4) in which the ratio ($S_2/S_1$) of actual area ($S_2$) of the viewable portion to the area ($S_1$) of the plane of projection was 25 was reduced most in increase of the pressure loss as compared with the ceramic filter structure (Comparative Example 1) in which the ratio ($S_2/S_1$) of actual area ($S_2$) of the viewable portion to the area ($S_1$) of the plane of projection was 2, and hereafter the increase of pressure loss was successively reduced in the following order: the ceramic filter structure (Example 3) in which the ratio ($S_2/S_1$) of the actual area ($S_2$) of the viewable portion to the area ($S_1$) of the plane of projection was 15, the ceramic filter structure (Example 2) in which the ratio ($S_2/S_1$) of the actual area ($S_2$) of the viewable portion to the area ($S_1$) of the plane of projection was 10, and the ceramic filter structure (Example 1) in which the ratio ($S_2/S_1$) of the actual area ($S_2$) of the viewable portion to the area ($S_1$) of the plane of projection was 6.5.

Figure 7:
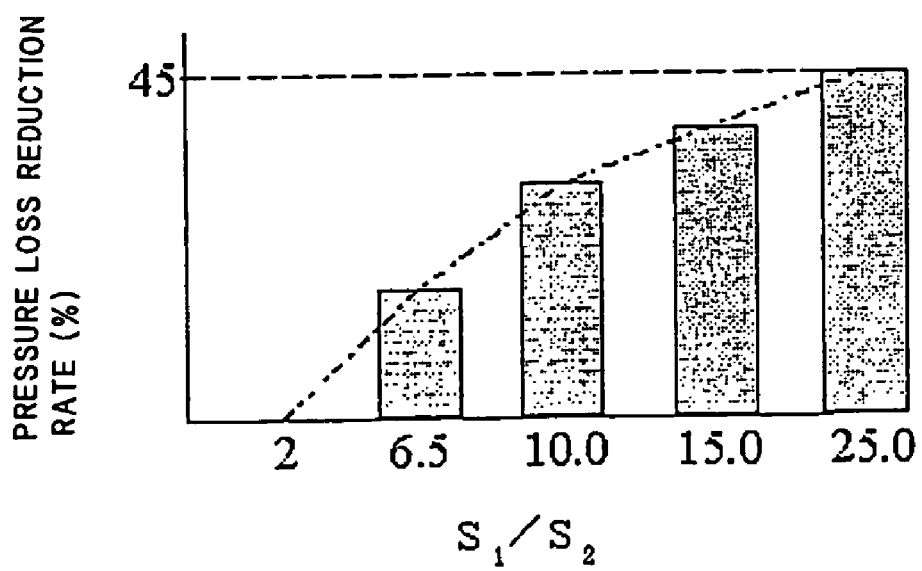
FIG. 7 is a graph which shows ratios (pressure loss reduction rates) of the pressure losses of the respective ceramic filter structures in the Examples of the present invention to the pressure loss of the ceramic filter structure in Comparative Example 1.

Furthermore, when 4.5 g/L of particulates were deposited in the ceramic filter structures (Examples 1-4 and Comparative Example 1), the ratio of the pressure loss in the ceramic filter structures (Examples 1-4) to the pressure loss in the ceramic filter structure of Comparative Example 1 (hereinafter sometimes referred to as "pressure loss reduction rate") was calculated. FIG. 7 is a graph showing the pressure loss reduction rate of the ceramic filter structures (Examples 1-4). As shown in FIG. 7, the ceramic filter structures of the Examples of the present invention were reduced in pressure loss in the case of the particulates being deposited on the partition walls as compared with the conventional ceramic filter structure of Comparative Example 1. Particularly, the pressure loss reduction rate in the ceramic filter structure of Example 4 was the highest, namely, 45%.

Figure 8:
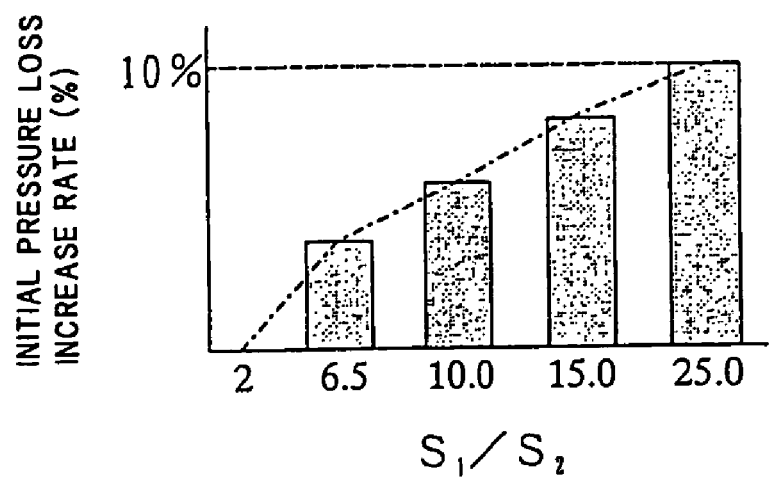
FIG. 8 is a graph which shows ratios (initial pressure loss reduction rates) of the initial pressure losses of the respective ceramic filter structures in the Examples of the present invention to the initial pressure loss of the ceramic filter structure in Comparative Example 1.

Moreover, initial pressure loss of the ceramic filter structures (Examples 1-4 and Comparative Example 1) was measured. The initial pressure loss is a pressure loss measured on the produced ceramic filter structures (Examples 1-4 and Comparative Example 1) which are in the state of being subjected to no treatment. FIG. 8 shows the ratio of the initial pressure loss in the ceramic filter structures (Examples 1-4) to the initial pressure loss in the ceramic filter structure of Comparative Example 1 (hereinafter sometimes referred to as "initial pressure loss increasing rate"). In case the ceramic filter structures are the same in their size, and the same in shape and size of the cells, the initial pressure loss is greater in the ceramic filter structure having rough surface of the partition walls, namely, having a higher ratio ($S_2/S_1$) of the actual area ($S_2$) of the viewable portion to the area ($S_1$) of the plane of projection. The ceramic filter structures of Examples 1-4 increased in initial pressure loss by about 10% at maximum as compared with the ceramic filter structure of Comparative Example 1, but such an increase in initial pressure loss causes no problem when they are used as filters, and, furthermore, the ceramic filter structures of Examples 1-4 considerably decreased in pressure loss reduction rate shown in FIG. 7, and hence are reduced in pressure loss when they are used continuously for a long time as filters.

Figure 9:
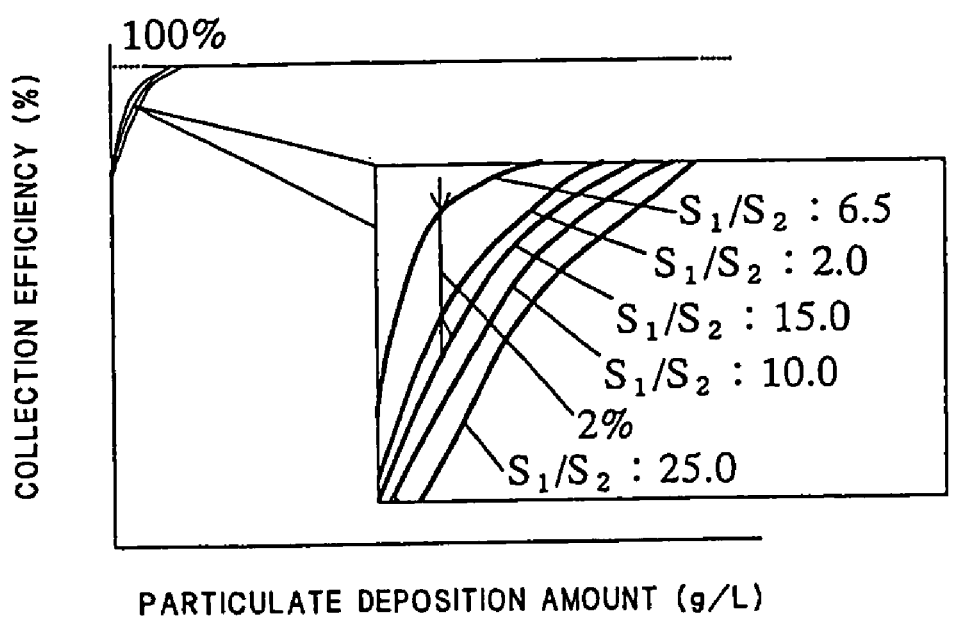
FIG. 9 is a graph which shows relations between deposition amount of particulates and particulates collection efficiency of the ceramic filter structures in the Examples of the present invention.
Figure 10:
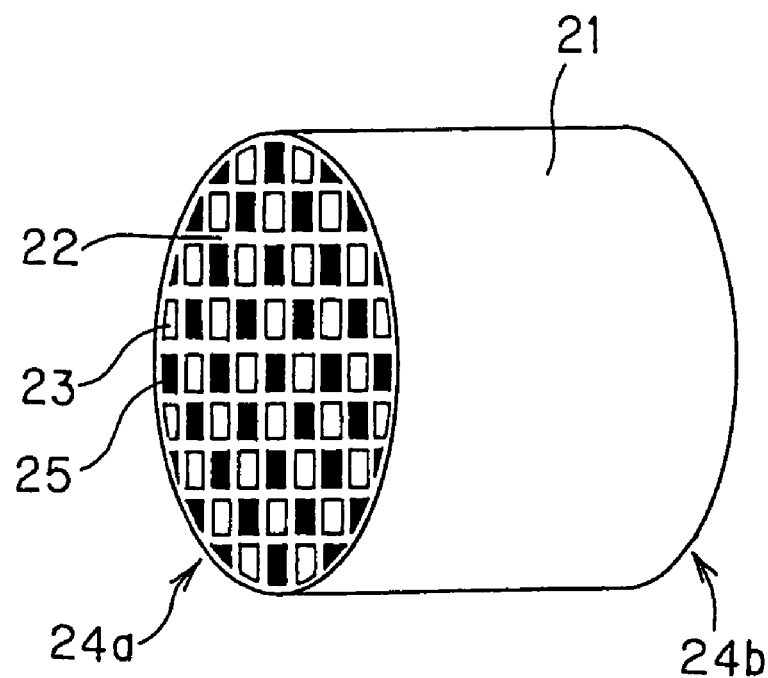
FIG. 10 is an oblique view which schematically shows a conventional ceramic filter structure.
Figure 11:
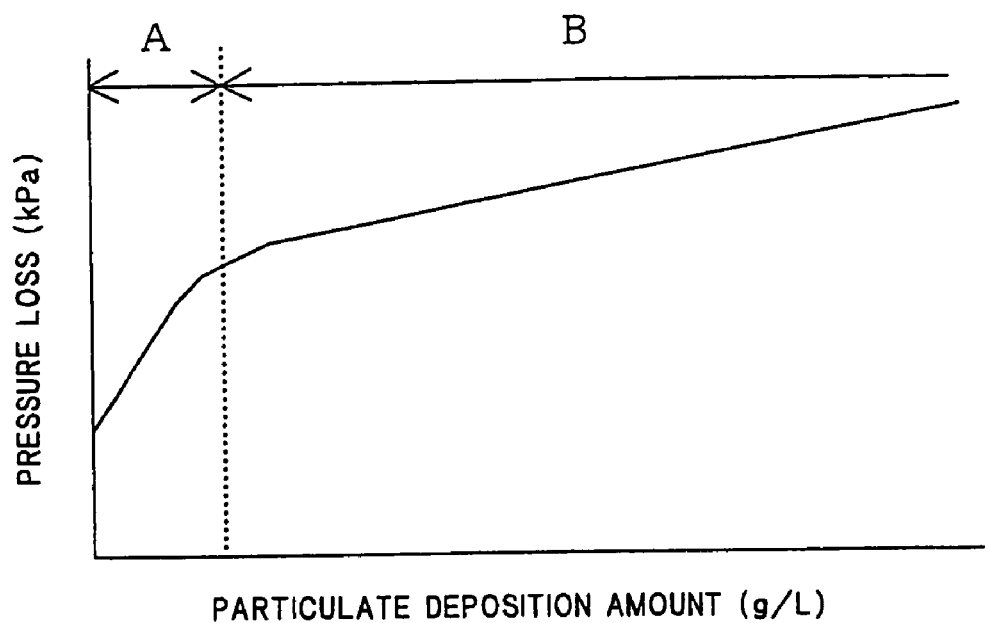
FIG. 11 is a graph which shows a relation between deposition amount of particulates and pressure loss of a conventional ceramic filter structure.

Furthermore, the collection efficiency of the ceramic filter structures (Examples 1-4 and Comparative Example 1) was measured. FIG. 9 is a graph showing the collection efficiency of the ceramic filter structures. As shown in FIG. 9, the difference in collection efficiency of the ceramic filter structures (Examples 1-4 and Comparative Example 1) falls within 2% and substantially no change is seen in the collection efficiency. The collection efficiency shown in FIG. 9 was measured by passing an exhaust gas containing soot generated by a soot generator through the ceramic filter structures (Examples 1-4 and Comparative Example 1) for a specified time (120 minutes), collecting with a filter paper the soot contained in the exhaust gas which passed through the ceramic filter structures (Examples 1-4 and Comparative Example 1), measuring the weight of the soot, and comparing the weight with the total weight of the soot generated.

INDUSTRIAL APPLICABILITY

As explained above, the ceramic filter material of the present invention is reduced in increase of pressure loss when it collects particulates, and hence can be suitably used, for example, as DPF which collects particulates discharged from diesel engines.

The invention claimed is:

1. A ceramic filter structure comprising a plurality of cells defined by partition walls having a porous structure to form flow passages of fluid, plugged portions being formed at one open end portions of specified cells and the other open end portions of the remaining cells to allow the partition walls to serve as filtration layers, wherein the ratio ($S_2/S_1$) of the actual area ($S_2$) of the portion of all actual area of one surface of a specified region of the partition walls which can be viewed from a vertical direction to a plane of projection obtained by vertically projecting the specified region of the partition walls on a plane from the one surface side to the area ($S_1$) of the said plane of projection is 5-30.

2. A ceramic filter structure according to claim 1, wherein the ratio ($S_2/S_1$) of the actual area ($S_2$) of the portion of all actual area of one surface of a specified region of the partition walls which can be viewed from a vertical direction to a plane of projection obtained by vertically projecting the specified region of the partition walls on a plane from the one surface side to the area ($S_1$) of the said plane of projection is 5-25.

3. A ceramic filter structure according to claim 1, wherein the constituent material of the partition walls is at least one material selected from the group consisting of cordierite, silicon carbide, sialon, composite material of metallic silicon-silicon carbide and silicon nitride.

4. A ceramic filter structure according to claim 1, wherein the constituent material of the partition walls is a porous material having a porosity of 30-80%.

5. A ceramic filter structure according to claim 1, wherein the shape of the open end portions of the cells is triangular, tetragonal, hexagonal or corrugated.

6. A ceramic filter structure according to claim 2, wherein the constituent material of the partition walls is at least one material selected from the group consisting of cordierite, silicon carbide, sialon, composite material of metallic silicon-silicon carbide and silicon nitride.

7. A ceramic filter structure according to claim 2, wherein the constituent material of the partition walls is a porous material having a porosity of 30-80%.

8. A ceramic filter structure according to claim 3, wherein the constituent material of the partition walls is a porous material having a porosity of 30-80%.

9. A ceramic filter structure according to claim 2, wherein the shape of the open end portions of the cells is triangular, tetragonal, hexagonal or corrugated.

* * * * *